United States Patent
Graham et al.

(10) Patent No.: US 9,772,041 B2
(45) Date of Patent: Sep. 26, 2017

(54) CHECK VALVE ASSEMBLY

(71) Applicant: DELPHI INTERNATIONAL OPERATIONS LUXEMBOURG, S.A.R.L., Bascharage (LU)

(72) Inventors: Mark S. Graham, Bristol (GB); Tristan P. Tremethick, Bristol (GB); Venkata Ravindra Mallela Viswa, Gloucestershire (GB); Ryan Williams, Gloucestershire (GB)

(73) Assignee: Delphi International Operations Luxembourg, Sarl, Luxembourg (LU)

( * ) Notice: Subject to any disclaimer, the term of this patent is extended or adjusted under 35 U.S.C. 154(b) by 219 days.

(21) Appl. No.: 14/386,021

(22) PCT Filed: Mar. 19, 2013

(86) PCT No.: PCT/EP2013/055711
§ 371 (c)(1),
(2) Date: Sep. 18, 2014

(87) PCT Pub. No.: WO2013/149826
PCT Pub. Date: Oct. 10, 2013

(65) Prior Publication Data
US 2015/0040868 A1    Feb. 12, 2015

(30) Foreign Application Priority Data

Apr. 5, 2012 (EP) .................................. 12163309

(51) Int. Cl.
*F16K 15/00* (2006.01)
*F02M 47/02* (2006.01)
(Continued)

(52) U.S. Cl.
CPC ....... *F16K 17/164* (2013.01); *F02M 63/0054* (2013.01); *F02M 63/0071* (2013.01);
(Continued)

(58) Field of Classification Search
CPC ........ F02B 19/12; F02B 1/04; F02B 19/1004; F16K 15/04; F16K 15/048; F16K 17/164;
(Continued)

(56) References Cited

U.S. PATENT DOCUMENTS 4,524,800 A * 6/1985 Holland ................. B60T 11/30
                                                137/516.27
5,791,374 A    8/1998 Black et al.
(Continued)

FOREIGN PATENT DOCUMENTS

DE    10 2010 001885 A1    8/2011
EP     1 921 307 A1        5/2008
(Continued)

OTHER PUBLICATIONS

International Search Report dated Apr. 29, 2013.

*Primary Examiner* — Syed O Hasan
(74) *Attorney, Agent, or Firm* — Joshua M. Haines (57) ABSTRACT

A non-return valve assembly for a high-pressure fuel injection system is disclosed. The valve comprises a valve chamber defined in part by a first body and in part by a second body and defining a valve chamber wall, an inlet passage formed in the first body and opening into the valve chamber at a valve seat defined by the first body, an outlet passage, and a valve ball received within the valve chamber and engageable with the valve seat so as to interrupt fluid flow from the outlet passage to the inlet passage through the valve chamber. The valve chamber wall comprises a plurality of guide portions to guide the valve ball in substantially linear movement within the valve chamber.

14 Claims, 4 Drawing Sheets

(51) Int. Cl.
  *F02M 69/46* (2006.01)
  *F16K 17/164* (2006.01)
  *F16K 15/04* (2006.01)
  *F02M 63/00* (2006.01)
  *F02M 63/02* (2006.01)

(52) U.S. Cl.
  CPC ......... *F02M 63/0225* (2013.01); *F16K 15/04* (2013.01); *F16K 15/048* (2013.01); *Y10T 137/774* (2015.04)

(58) Field of Classification Search
  CPC .............. F04B 53/101; F02M 63/0054; F02M 63/0071; F02M 63/0225
  USPC ....... 123/267, 456; 137/533.11, 485; 239/88
  See application file for complete search history.

(56) References Cited

U.S. PATENT DOCUMENTS

| | | | |
|---|---|---|---|
| 7,444,990 B1 * | 11/2008 | Fisher | F02D 33/006 123/459 |
| 2002/0170539 A1 | 11/2002 | Rembold et al. | |
| 2003/0127140 A1 | 7/2003 | Warlick | |
| 2003/0132410 A1 | 7/2003 | Stoecklein et al. | |
| 2008/0154479 A1 | 6/2008 | Graham | |
| 2011/0232779 A1 * | 9/2011 | Oh | F16K 17/20 137/485 |

FOREIGN PATENT DOCUMENTS

| | | |
|---|---|---|
| EP | 1953430 A1 | 8/2008 |
| JP | S59-88565 A1 | 6/1984 |
| JP | 11-343945 A | 12/1999 |
| JP | 2000-297710 A1 | 10/2000 |

\* cited by examiner

CHECK VALVE ASSEMBLY

CROSS REFERENCE TO RELATED APPLICATIONS

This application is a national stage application under 35 U.S.C. 371 of PCT Application No. PCT/EP2013/055711 having an international filing date of 19 Mar. 2013, which designated the United States, which PCT application claimed the benefit of European Patent Application No. 12163309.3 filed on 5 Apr. 2012, the entire disclosure of each of which are hereby incorporated herein by reference.

FIELD OF THE INVENTION

The present invention relates to a valve assembly for use in a high-pressure fuel injection system. In particular, but not exclusively, the invention relates to a valve assembly for preventing back-flow of fuel from a fuel accumulator to a fuel pump.

BACKGROUND TO THE INVENTION

Figure 1:
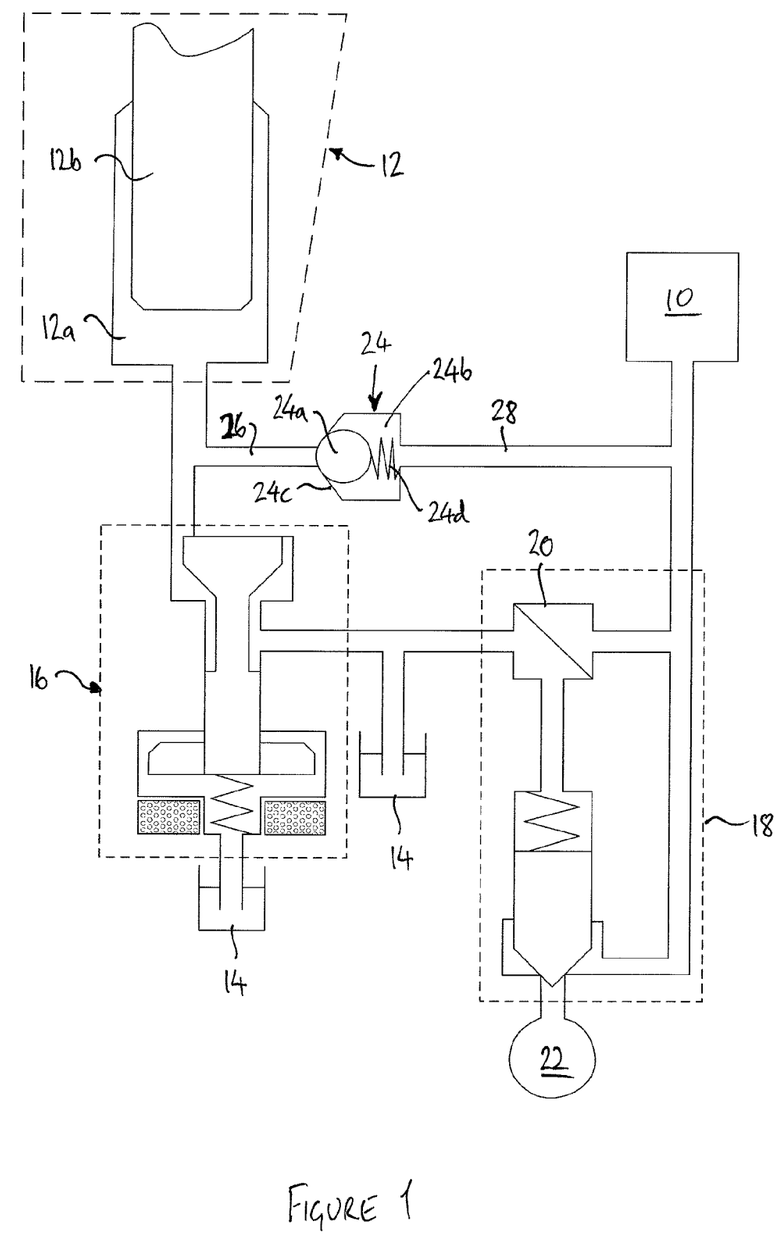
FIG. 1 of the accompanying drawings, which has already been referred to above, is a schematic illustration of a known fuel injection system having a non-return valve situated between a pump chamber of a high-pressure fuel pump and a fuel rail.

FIG. 1 of the accompanying drawings illustrates, schematically, a fuel injection system of the common-rail type for use in an internal combustion engine, for example as described in EP-A-1921307. An accumulator volume for fuel, known as a common rail 10, is supplied with high pressure fuel from a high-pressure fuel pump 12. The high-pressure pump 12 includes a pump chamber 12a which receives fuel from a low-pressure source or reservoir 14 by way of a metering valve 16. The pump 12 also includes a pumping element or plunger 12b which is driven in linear reciprocal motion to change the volume of the pump chamber 12a in a cyclical manner. On a filling or return stroke of the plunger 12b, fuel is drawn from the reservoir 14 into the pump chamber 12a, and on a pumping or forward stroke of the plunger 12b, fuel is pressurised in the pump chamber 12a and is forced under high pressure into the common rail 10.

The common rail 10 supplies high-pressure fuel to a plurality of fuel injectors 18, only one of which is shown in FIG. 1, and each fuel injector is operable under the control of a control valve 20 to cause injection of fuel into an associated cylinder 22 of the engine.

To maintain the high fuel pressure in the common rail 10, and to prevent high-pressure fuel from the common rail 10 flowing back towards the pump 12 and the metering valve 16, particularly during the return stroke of the plunger 12b, it is necessary to include a non-return valve 24 (also known as a one-way valve or a check valve) in the fuel flow path between the pump 12 and the common rail 10.

The non-return valve 24 comprises a ball 24a received in a valve chamber 24b. An inlet passage 26, which is in fluid communication with the pump 12, opens into the valve chamber at a valve seat 24c. An outlet passage 28 opens into the valve chamber at a location remote from the valve seat 24c, such that fluid communication between the valve chamber 24b and the outlet passage 28 is continually open. The outlet passage 28 is in fluid communication with the common rail 10.

The ball 24a is biased towards the valve seat 24c by a valve spring 24d. During the forward stroke of the plunger 12b, the ball 24a moves away from the valve seat 24c to allow fuel to flow from the inlet passage 26, through the valve chamber 24b, and to the common rail 10 through the outlet passage 28. During the return stroke of the plunger 12b, the ball 24a is caused to engage with the valve seat 24c by the spring 24d. Flow from the common rail 10 back to the pump chamber 12a is thereby prevented. In this arrangement, movement of the ball 24a can be precisely controlled by suitable selection of the spring 24d, which determines the force with which the ball 24a is urged towards the valve seat 24c.

To reduce the part count of the valve and to improve reliability, it can be desirable to omit the valve spring 24d, so that the ball 24c is free to move within the valve chamber 24b. In such an arrangement, during the return stroke of the plunger 12b, the ball 24a is drawn to engage with the valve seat 24c by the partial vacuum created by the volume increase in the pump chamber 12a, and is kept in contact with the valve seat 24c by the high rail pressure acting on the ball 24a. Flow from the common rail 10 back to the pump chamber 12a is thereby prevented. However, since the forces acting on the ball in this arrangement are exclusively derived from the fuel pressure acting on each side of the ball 24a, movement of the ball 24a is less well-controlled, and therefore the opening and closing behaviour of the non-return valve is less predictable.

Against this background, it would be desirable to provide a non-return valve arrangement with good reliability, low part count and precisely-defined opening and closing behaviour.

SUMMARY OF THE INVENTION

From a first aspect, the present invention resides in a non-return valve assembly for a high-pressure fuel injection system, comprising a valve chamber defined in part by a first body and in part by a second body and defining a valve chamber wall, an inlet passage formed in the first body and opening into the valve chamber at a valve seat defined by the first body, an outlet passage, and a valve ball received within the valve chamber and engageable with the valve seat so as to interrupt fluid flow from the outlet passage to the inlet passage through the valve chamber. The valve chamber wall comprises a plurality of guide portions to guide the valve ball in substantially linear movement within the valve chamber.

By virtue of the guide portions, movement of the valve ball is constrained such that the position of the valve ball can be more accurately predicted. Advantageously, therefore, the present invention allows the shape of the valve chamber and the valve seat to be optimised to control the opening and closing characteristics of the valve, even if a biasing spring is omitted.

Furthermore, by providing guide portions of the valve chamber wall to guide the valve ball in substantially linear movement, the location at which the ball impacts the valve seat is more precisely controlled than would be the case if no guide portions were present. This enables the ball and valve seat to 'bed in' (i.e. a localised region of the valve seat deforms by plastic flow and/or wears to conform to the shape of the ball) relatively early in the operating life of the valve, which helps to avoid leakage past the valve seat. Similarly, if a lift stop is provided to limit the opening movement of the ball away from the valve seat, the ball and the lift stop likewise 'bed in' relatively early in the operating life of the valve.

According to an embodiment of the invention, the first and second bodies may define respective mating faces, so that a part of the mating face of the first body abuts a part of the mating face of the second body to form a seal therebetween. Advantageously, this arrangement provides a sufficiently good seal between the first and second bodies to prevent leakage from the valve chamber even when the fuel pressure in the valve chamber is very high, in use.

The valve chamber may be formed as a recess in the mating face of the first body. For example, the valve chamber may be formed from a plurality of bores in the mating face of the first body. In one embodiment, the valve chamber is formed from a central bore and a plurality of peripheral bores overlapping with the central bore, and the guide portions are preferably defined by regions of the central bore between adjacent peripheral bores. In this way, the valve chamber may comprise a plurality of lobes extending laterally from a central volume. The valve seat may be defined at an internal end of the central bore.

These arrangements allow the shape of the valve chamber to be defined accurately using simple manufacturing processes. For example, a central bore can be formed by drilling into the mating face of the first body, and then the peripheral bores and the valve seat can be shaped by suitable machining processes.

According to one embodiment of the invention, the mating faces are substantially planar. Providing planar mating faces helps to ensure a good seal between the faces, particularly when a high degree of planarity is achieved. Accordingly, the mating faces may be ground or otherwise machined.

The valve assembly may be springless. In other words, the valve ball is biased to move into engagement with the valve seat by fluid pressure alone. Alternatively, a biasing means, such as a spring, may be provided to bias the ball into engagement with the valve seat.

According to one embodiment of the invention, the mating face of the second body may define a lift stop for the ball. The lift stop may be a planar surface of the mating face, or alternatively the lift stop may be suitably shaped. When a biasing means is provided, the biasing means may limit movement of the ball away from the valve seat, in which case a lift stop may be unnecessary.

The outlet passage is preferably formed in the second body. In one arrangement, the outlet opens onto a mating face of the second body. When the valve chamber is formed from a central bore and a plurality of peripheral bores overlapping the central bore, the outlet passage may open into one of the peripheral bores of the valve chamber.

To control the movement of the valve ball, the valve seat may be substantially frustoconical. For example, the valve seat may define a cone angle of between approximately 80 degrees and approximately 100 degrees, and preferably of approximately 90 degrees.

In one embodiment, the valve chamber wall comprises three guide portions spaced equi-angularly around the ball. This arrangement has been found to be particularly advantageous both in controlling movement of the ball, and for ease of manufacture. For similar reasons, the guide portions may comprise part-cylindrical portions of the valve chamber wall.

The inlet passage may comprise a part-spherical inlet chamber that opens onto the valve seat. In this way, the inlet passage can be inclined with respect to the axis of movement of the ball, without a detrimental effect on the fluid flow at the valve seat. In particular, with this arrangement, the fluid pressure acting on the ball is substantially uniform around the circumference of the valve seat.

The present invention also extends, in a second aspect, to a fuel injection system for an internal combustion engine, comprising a high-pressure fuel pump having a pump chamber, a fuel rail for supplying a plurality of fuel injectors, and a non-return valve assembly according to the first aspect of the invention. Fluid flow from the fuel rail to the pump chamber is interrupted by the non-return valve.

Preferred and/or optional features of the first aspect of the invention may be used, alone or in appropriate combination, in the second aspect of the invention also.

BRIEF DESCRIPTION OF THE DRAWINGS

The present invention will now be described, by way of example only, with reference to the remaining accompanying drawings, in which.

DETAILED DESCRIPTION OF EMBODIMENTS OF THE INVENTION

Figure 2:
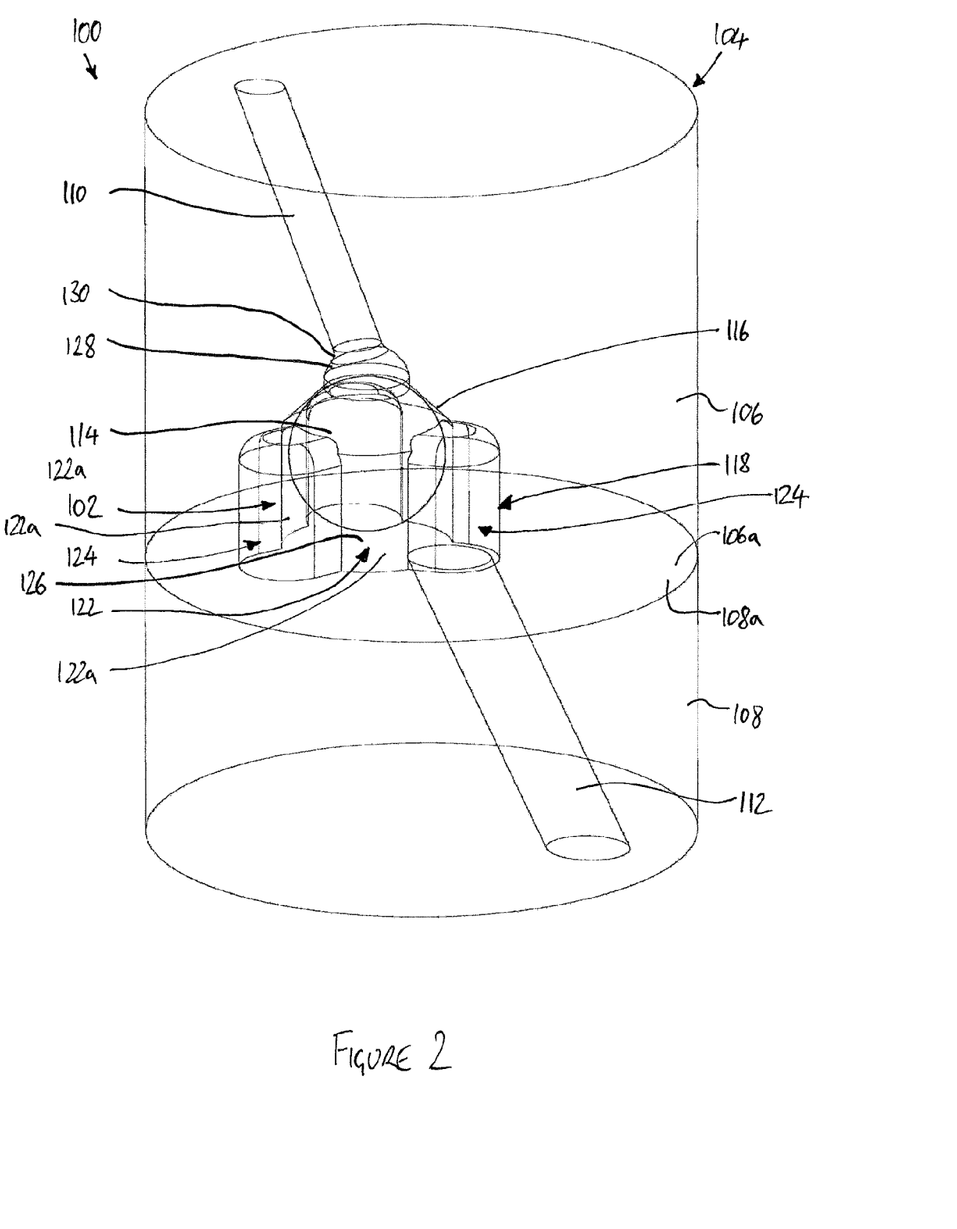
FIG. 2 is a schematic perspective view of a first non-return valve assembly according to the invention.
Figure 3:
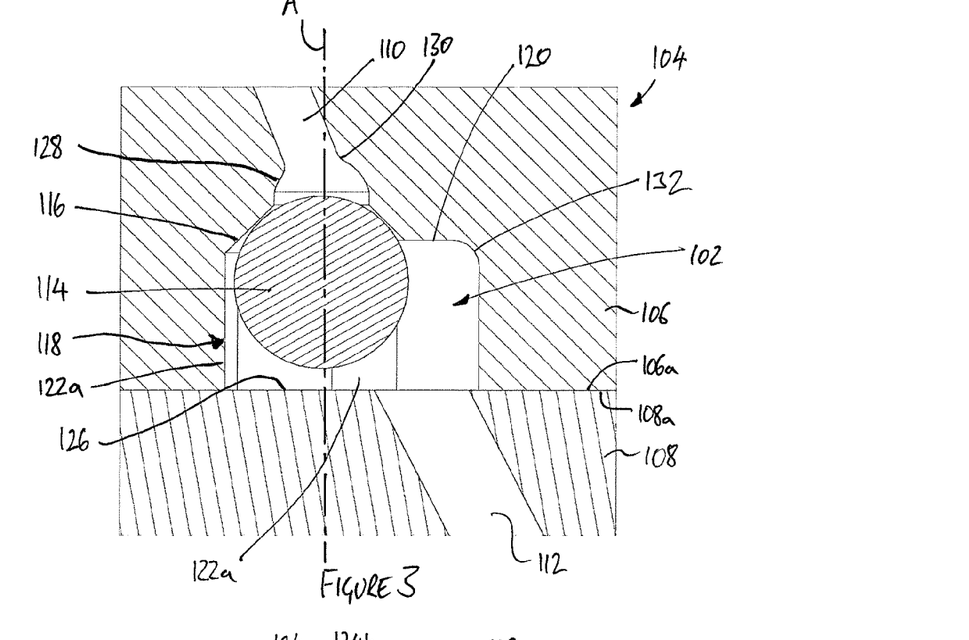
FIG. 3 is a schematic vertical cross-sectional view of the non-return valve assembly of FIG. 2.
Figure 4:
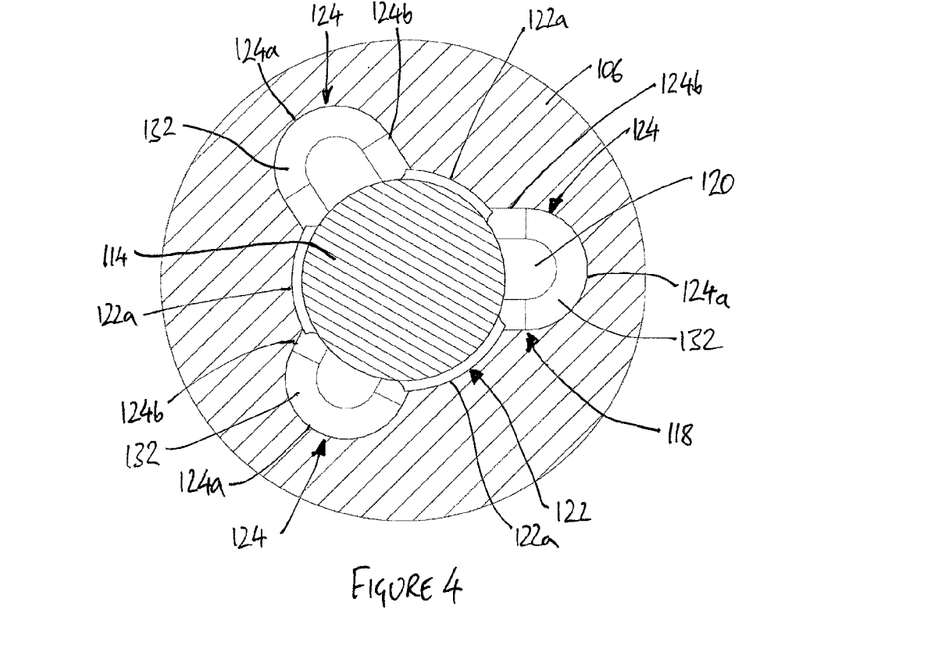
FIG. 4 is a schematic horizontal cross-sectional view of the non-return valve assembly of FIG. 2.

A non-return valve assembly 100 according to a first embodiment of the present invention, for use in a high-pressure fuel injection system, is shown in FIGS. 2 to 4.

Referring initially to FIGS. 2 and 3, the valve assembly 100 comprises a valve chamber 102 defined within a valve housing 104. The valve housing 104 comprises a first housing body 106 and a second housing body 108. An inlet passage 110 is formed in the first housing body 106 to deliver fuel into the valve chamber 102 from the pump chamber (not shown) of an associated high-pressure fuel pump. An outlet passage 112 is formed in the second housing body 108 to convey fuel from the valve chamber 102 to a high-pressure fuel rail (not shown).

The valve assembly 100 further comprises a valve ball 114, which is received within the valve chamber 102. The valve ball 114 is moveable within the chamber 102 to engage with a valve seat 116 formed in the first housing body 106 where the inlet passage 110 opens into the valve chamber 102. As shown most clearly in FIG. 3, when the ball 114 is engaged with the valve seat 116, reverse flow of fuel from the valve chamber 102 into the inlet passage 110 is prevented.

The first and second housing bodies 106, 108 seal against one another at respective planar mating faces 106a, 108a around the periphery of the valve chamber 102. When the non-return valve assembly 100 is used in a high-pressure fuel injection system, the fuel pressure in the valve chamber 102 may be 2000 bar or more. Therefore, to ensure that the seal formed between the abutting mating faces 106a, 108a is capable of preventing fuel leakage from the valve chamber 102, the housing bodies 106, 108 are firmly clamped together by suitable clamping means (not shown).

Conveniently, the non-return valve assembly 100 may be accommodated within the housing of a fuel pump (not shown), in which case the housing of the fuel pump or another component of the fuel pump could provide the clamping means. The valve assembly 100 may instead be accommodated elsewhere, for example in a separate housing or in a housing of a common rail.

The valve chamber 102 is formed as a recess in the mating face 106a of the first housing body 106. As will be described below, the recess is formed from a plurality of overlapping bores which extend inwardly from and perpendicular to the mating face 106a to define a valve chamber wall 118. The valve chamber wall 118 thereby meets the mating face 106a at a right angle. The end of the recess opposite the mating face 106a is closed by a valve chamber roof 120, in which the valve seat 116 is formed. The end of the recess at the mating face 106a of the first housing body 106 is closed by the planar mating face 108a of the second housing body 108.

Referring additionally to FIG. 4, which is a cross-sectional view through the first housing body 106 looking towards the valve chamber roof 120, the valve chamber 102 comprises a central region 122 bounded by three part-cylindrical portions 122a of the valve chamber wall 118. The part-cylindrical portions 122a, known hereafter as guide portions 122a, lie on a common cylinder, such that the central region 122 of the valve chamber 102 describes a generally cylindrical volume.

Three lobes 124 are disposed peripherally to and equi-angularly around the central region 122, with each lobe 124 being positioned between two adjacent guide portions 122a. Each lobe 124 is defined by an outlying part-cylindrical portion 124a of the valve chamber wall 118, joined to the central region 122 by a pair of parallel planar wall portions 124b.

The valve chamber 102 can therefore be formed for example by a first, central bore which creates the generally cylindrical central region 122, and by three further bores which overlap with the central region 122 to define the part-cylindrical wall portions 124a of the lobes 124. The planar wall portions 124b can be formed by suitable machining to blend the part-cylindrical wall portions 124a with each adjacent guide portion 122a. The valve seat 116 can be formed at the internal end of the first bore by suitable machining.

As can be seen most clearly in FIG. 4, the three part-cylindrical guide portions 122a are arranged equi-angularly around the valve ball 114. The guide portions 122a are a close clearance fit with the diameter of the valve ball 114, so that lateral movement of the valve ball 114 is restricted by the guide portions 122a. In this way, movement of the valve ball 114 is guided by the valve chamber wall 118 in substantially linear movement within the valve chamber 102 along an axis (labelled A in FIG. 3) that lies normal to the planar mating face 108a of the second body 108.

To avoid wear and to allow unhindered linear movement of the ball 114, the internal diameter of the cylinder described by the guide portions 122a is smaller than the external diameter of the ball 114 to create a gap or clearance between the guide portions 122a and the ball 114. The clearance between the guide portions 122a and the ball 114 also allows any concentric misalignment between the valve seat 116 and the guide portions 122a to be accommodated during operation of the valve assembly 100.

As shown most clearly in FIGS. 2 and 3, the peripheral lobes 124 provide a relatively large cross-sectional area for fuel flow past the valve ball 114 when the ball 114 is unseated, such that the presence of the guide portions 122a does not appreciably restrict the flow rate through the valve.

A region of the planar mating face 108a of the second housing body 108 is exposed to the interior of the valve chamber 102, as can be seen in FIGS. 2 and 3. This exposed region defines a lift stop 126 that serves to limit movement of the valve ball 114 away from the valve seat 116. Because lateral movement of the ball 114 is constrained by the guide portions 122a, the ball 114 always impacts the lift stop 126 in substantially the same position. Advantageously, therefore, "bedding in" of the lift stop 126 by deformation due to repeated impact of the ball 114 occurs relatively early in the service life of the valve assembly 100, and the deformation is relatively localised.

The shape of the valve seat 116 can be seen most clearly in FIG. 3. The valve seat 116 comprises a frustoconical recess in the valve chamber roof 120. In this example, the cone angle defined by the valve seat 116 is 90°. A cone angle of approximately 90° has been found to result in particularly good control of movement of the ball 114. In other examples (not shown), the cone angle defined by the valve seat 116 may be between approximately 80° and approximately 100°.

To withstand high fuel pressures in use, the housing bodies 106, 108 are preferably made from a relatively high-strength metallic material, such as high-strength steel. The mating faces 106a, 108a are preferably precision-ground with a high degree of planarity, which helps to ensure a good seal between the faces 106a, 108a.

The inlet passage 110 communicates with the valve seat 116 by way of a part-spherical inlet chamber 128, visible in FIGS. 2 and 3. The inlet passage 110 is inclined to the axis of movement (A in FIG. 3) of the ball 114. However, the inlet chamber 128 opens onto the valve seat 116 at a circular opening which is coaxial with the axis A, such that fuel pressure acts substantially uniformly on the ball 114 parallel to the axis A.

The inlet passage 110 meets the inlet chamber 128 at a radiused or smoothed transition region 130. By providing a radiused transition region 130, instead of a sharp corner, the associated stress concentrations in the first housing body 106 are reduced, which reduces the risk of fatigue failure. Also, the radiused transition region 130 helps to improve fuel flow through the inlet passage 110, the inlet chamber 128 and the valve chamber 102.

Similarly, further radiused transition regions 132 of the valve chamber wall 118 are provided where the part-cylindrical and planar wall portions 124a, 124b of the lobes 124 meet the roof 120 of the valve chamber 102. Again, these radiused transition regions 132 help to reduce stress concentrations in the first housing body 106, and improve fuel flow through the valve chamber 102.

Like the inlet passage 110, the outlet passage 112 is also inclined with respect to the ball movement axis A. The outlet passage 112 opens into one of the lobes 124 of the valve chamber 102.

The valve ball 114 is made from a suitable wear-resistant, stiff material. For example, the valve ball 114 may be made from a ceramic material such as silicon nitride, and may be manufactured by sintering and grinding.

An example of the use of the valve assembly 100 will now be described, in which the valve assembly 100 of the invention is used in place of the valve 24 shown in the fuel injection system in FIG. 1.

In use, the inlet passage 110 is connected to the pump chamber of the high-pressure fuel pump, and the outlet passage 112 is connected to the common rail. FIGS. 2 to 4 show the valve assembly 100 with the valve ball 114 in its closed position, engaged with the valve seat 116.

When the fuel pressure in the inlet passage 110 increases during a pumping stroke of the pump plunger, the fuel pressure acting on the area of the valve ball 114 exposed to fuel in the inlet chamber 128, upstream of the valve seat 116, increases significantly. This increase in pressure forces the valve ball 114 away from the valve seat 116, opening the valve for flow of fuel from the inlet passage 110 to the outlet passage 112 by way of the valve chamber 102. Opening movement of the valve ball 114 is arrested when the ball 114 contacts the lift stop 126.

As soon as the ball 114 disengages the valve seat 116, fuel can flow relatively freely around the ball 114 through the lobes 124 of the valve chamber 102. In this way, the force acting on the ball 114 as it travels towards the lift stop 126 is relatively low. Damage to the lift stop 126 can therefore be minimised in the design of the present invention, in particular by virtue of the shape of the valve chamber 102 and the valve seat 116.

For example, the choice of geometry of the valve seat 116, and in particular the seat width and the inside diameter of the seat 116, can be selected to provide a desired opening force on the ball 114. As well as minimising damage to the lift stop 126, such optimisation of the valve seat geometry can ensure that the ball does not reciprocate or vibrate within the valve chamber 102 or self-close due to the Bernoulli effect acting to reduce the pressure on the ball 114 at the valve seat 116 where the fuel velocity is high during the initial opening movement of the ball 114.

At the start of the return stroke, the fuel pressure in the inlet passage 110 drops as the pump plunger retracts. A small quantity of fuel returns to the pump chamber from the valve chamber 102, which in turn causes the ball 114 to return to engage with the valve seat 116. The ball 114 is held in engagement with the valve seat 116 during the remainder of the return stroke due to the reduction in pressure in the inlet passage 110 and the relatively high pressure of fuel in the outlet passage 112 resulting from fuel stored in the common rail.

Figure 5:
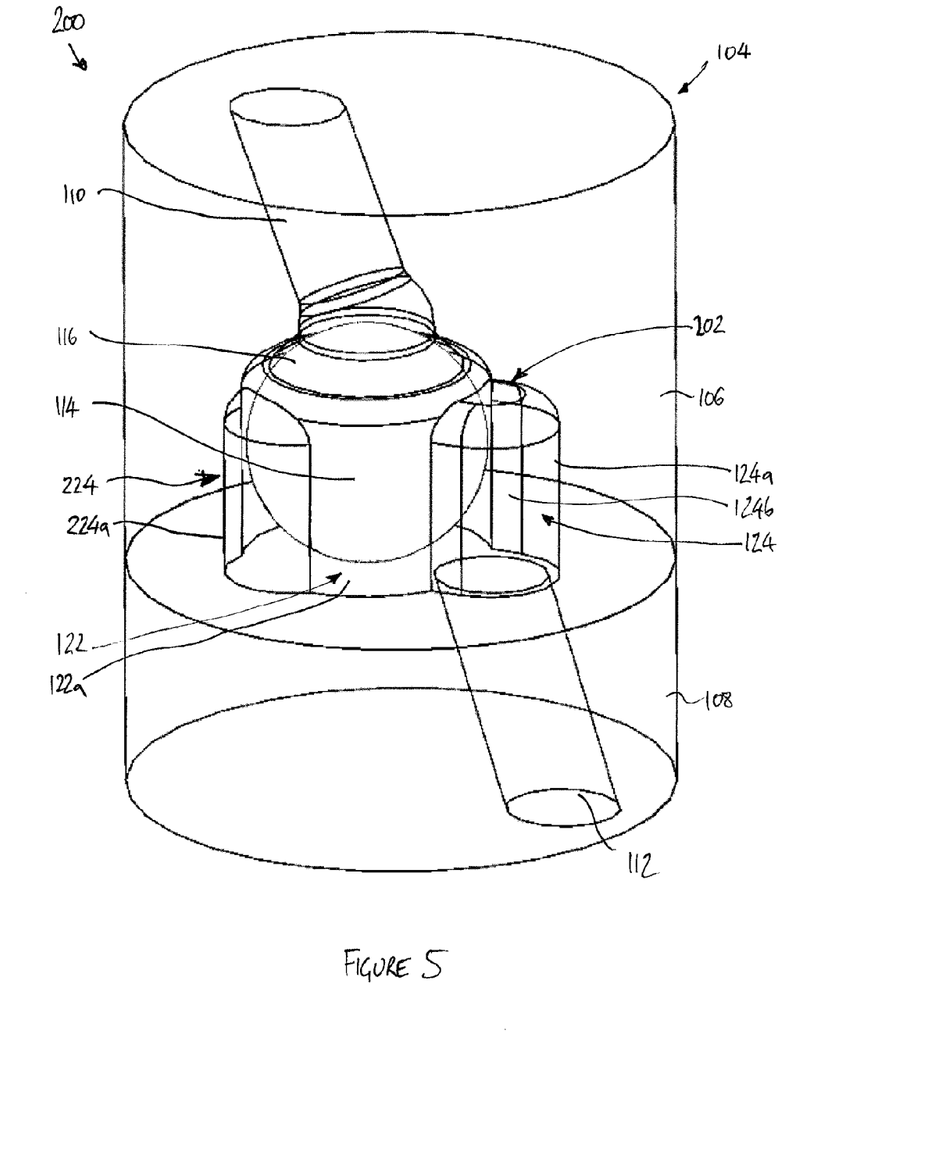
FIG. 5 is a schematic perspective view of a second non-return valve assembly according to the invention.

It will be appreciated that several variations and modifications of the present invention are possible. By way of example, FIG. 5 shows a non-return valve assembly 200 according to a second embodiment of the invention which differs from the valve assembly 100 of FIGS. 2 to 4 in the shape of the valve chamber. The remaining features common to both embodiments, indicated where appropriate with common reference numerals, will not be described in detail.

In the valve 200 of FIG. 5, the valve chamber 202 includes a central region 122 defined by three part-cylindrical guide portions 122a, as in the first embodiment of the invention. However, in this second embodiment, the lobes 124, 224 of the valve chamber 202 are of unequal dimensions.

One of the lobes 124, into which the outlet passage 112 opens, is defined by an outlying part-cylindrical portion 124a of the valve chamber wall 118, joined to the central region 122 by a pair of parallel planar wall portions 124b.

The remaining two lobes 224 (only one of which is visible in FIG. 5) are defined only by part-cylindrical portions 224a of the valve chamber wall 118, with no planar wall portions. In other words, the part-cylindrical portions 224a connect directly with the guide portions 122a. These two lobes 224 are therefore smaller in cross-sectional area than the lobe 124 into which the outlet passage 112 opens.

Further variations and modifications of the invention are also possible. In particular, variations of the geometry of the valve chamber, the valve seat, the inlet chamber and the inlet and outlet passages may be made to optimise the performance of the valve for a given application. In this regard, it is advantageous that the valve ball is guided substantially along a linear movement axis, since modelling of the geometry of the valve during design and optimisation is greatly simplified compared to arrangements in which the valve ball is free to move laterally as well as axially.

In the illustrated embodiments, the lift stop 126 is initially a planar surface, although it will be appreciated that some deformation of the lift stop 126 may occur as the valve ball beds in. However, in other embodiments, a shaped or profiled lift stop may be provided.

The arrangement of three guide portions and three lobes, as shown in the illustrated embodiments, is relatively easy to manufacture. However, it will be appreciated that more or fewer than three guide portions and lobes could instead be provided.

The illustrated embodiments of the invention do not require a biasing spring to bias the valve ball into engagement with the seat. In such springless arrangements, the valve ball is moved into engagement with the seat by fluid pressure alone. However, in other arrangements, a spring or other resilient biasing means may be provided, in which case the planar mating face of the second body may be used as an abutment surface for the spring, instead of as a lift stop.

Further modifications and variations of the invention may also be contemplated without departing from the scope of the invention as defined in the appended claims.

The invention claimed is:

1. A non-return valve assembly for a high-pressure fuel injection system, comprising:
   a valve chamber defined in part by a first body and in part by a second body and defining a valve chamber wall, the first and second bodies defining respective planar mating faces, such that a part of the mating face of the first body abuts a part of the mating face of the second body to form a seal therebetween;
   an inlet passage formed in the first body and opening into the valve chamber at a valve seat defined by the first body;
   an outlet passage; and
   a valve ball received within the valve chamber and engageable with the valve seat so as to interrupt fluid flow from the outlet passage to the inlet passage through the valve chamber;
   wherein the valve chamber wall comprises a plurality of guide portions downstream of the valve seat to guide the valve ball in substantially linear movement within the valve chamber;
   wherein the plurality of guide portions are separated by a plurality of peripheral lobes downstream of the valve seat through which fluid flows past the valve ball when the valve ball is not engaged with the valve seat, the plurality of peripheral lobes being in fluid communication with the outlet passage when the valve ball is engaged with the valve seat to interrupt fluid flow from the outlet passage to the inlet passage.

2. A non-return valve assembly according to claim 1, wherein the valve chamber is formed as a recess in the mating face of the first body.

3. A non-return valve assembly according to claim 2, wherein the valve chamber is formed from a plurality of bores in the mating face of the first body.

4. A non-return valve assembly according to claim 3, wherein the valve chamber is formed from a central bore and a plurality of peripheral bores overlapping with the central bore, and wherein the guide portions are defined by regions of the central bore between adjacent peripheral bores.

5. A non-return valve assembly according to claim 4, wherein the valve seat is defined at an internal end of the central bore.

6. A non-return valve assembly according to claim 1, wherein the mating face of the second body defines a lift stop for the ball.

7. A non-return valve assembly according to claim 1, wherein the outlet passage is formed in the second body.

8. A non-return valve assembly according to claim 1, wherein the valve seat is frustoconical.

9. A non-return valve assembly according to claim 8, wherein the valve seat defines a cone angle of between approximately 80 degrees and approximately 100 degrees.

10. A non-return valve assembly according to claim 1, wherein the valve chamber wall comprises three guide portions spaced equi-angularly around the ball.

11. A non-return valve assembly according to claim 1, wherein the guide portions comprise part-cylindrical portions of the valve chamber wall.

12. A non-return valve assembly according to claim 1, wherein the inlet passage comprises a part-spherical inlet chamber that opens onto the valve seat.

13. A fuel injection system for an internal combustion engine, comprising:
 a high-pressure fuel pump having a pump chamber;
 a fuel rail for supplying a plurality of fuel injectors; and
 a non-return valve assembly according to claim 1;
 wherein fluid flow from the fuel rail to the pump chamber is interrupted by the non-return valve assembly.

14. A non-return valve assembly for a high-pressure fuel injection system, comprising:
 a valve chamber defined in part by a first body and in part by a second body and defining a valve chamber wall, the first and second bodies defining respective planar mating faces, such that a part of the mating face of the first body abuts a part of the mating face of the second body to form a seal therebetween;
 an inlet passage formed in the first body and opening into the valve chamber at a valve seat defined by the first body;
 an outlet passage; and
 a valve ball received within the valve chamber and engageable with the valve seat so as to interrupt fluid flow from the outlet passage to the inlet passage through the valve chamber;
 wherein the valve chamber wall comprises a plurality of guide portions downstream of the valve seat to guide the valve ball in linear movement within the valve chamber.

\* \* \* \* \*